May 9, 1950     A. ANDERSON     2,507,083
FISHHOOK EXTRACTOR
Filed Jan. 4, 1945
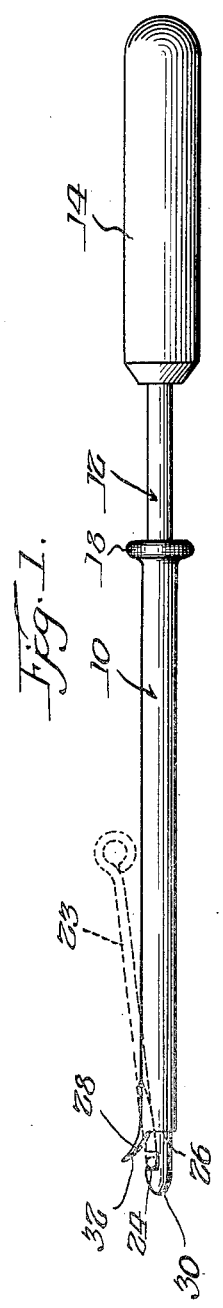
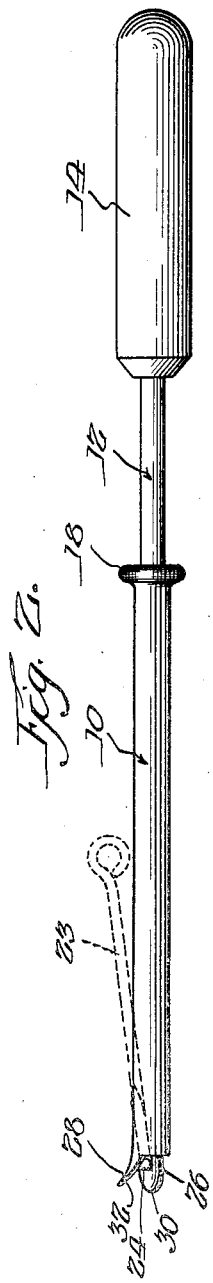
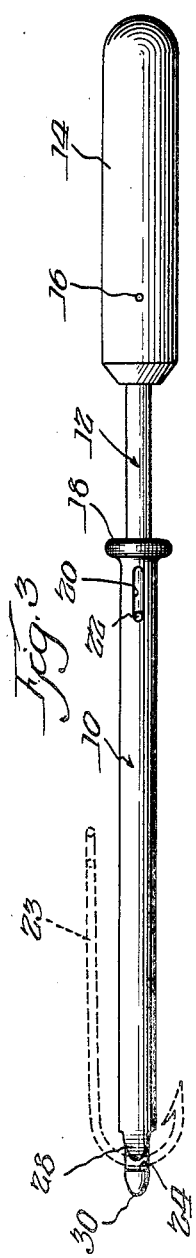
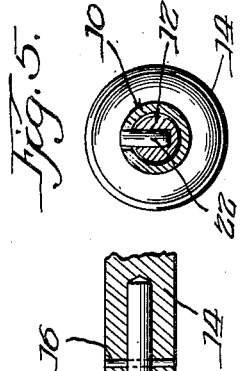
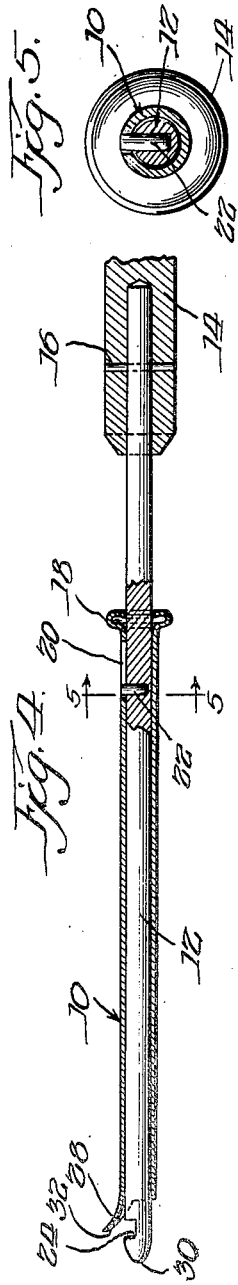
Inventor:
Anton Anderson Patented May 9, 1950

2,507,083

UNITED STATES PATENT OFFICE 2,507,083

FISHHOOK EXTRACTOR

Anton Anderson, Highwood, Ill.

Application January 4, 1945, Serial No. 571,297

2 Claims. (Cl. 43—53.5)

The invention relates to fish hook extractors and has reference in particular to an improved extractor for this purpose which will have a positive grip on the fish hook for extracting the same, and which will be relatively simple in operation, embodying few parts, and thus economical to manufacture.

A more specific object of the invention is to provide a fish hook extractor by means of which a fish hook or the like can be gripped in a firm manner as a preliminary step to removing said hook, and wherein the hook may be effectively removed by a few simple operations, and which will at all times remain under positive control of the operator.

Another object of the invention is to provide a fish hook extractor constructed of two parts relatively movable with respect to each other, and which will have many other uses in addition to removing hooks from fish and the like by reason of its improved mode of operation.

With these and other objects in view the invention may consist of certain novel features of construction and operation as will be more fully described and particularly pointed out in the specification, drawings and claims appended hereto.

In the drawings which illustrate one embodiment of the invention, and wherein like reference characters are used to designate like parts:

Figure 1 is a side elevational view of the fish hook extractor of the invention with the parts in open position;

Figure 2 is a side elevational view similar to Figure 1 but showing the parts in clamping position with respect to a fish hook;

Figure 3 is a top plan view of the extractor as shown in Figure 1, clearly illustrating the manner in which a fish hook is engaged thereby;

Figure 4 is a longitudinal sectional view of the extractor; and

Figure 5 is a transverse sectional view on an enlarged scale, taken substantially along line 5—5 of Figure 4.

Referring to the drawings, the fish hook extractor selected for illustration essentially consists of a tubular member 10 having telescoping relation with the rod 12. The length of the rod 12 is considerably greater than that of the tubular member 10 for the reason that the rod provides the handle part of the extractor and has the handle 14 suitably fixed to the rear end of the same. Said handle may be formed of wood, hard rubber, plastic or the like, and the same may have a press fit on the rear end of rod 12 or the handle may be interlocked with the rod by means of the pin 16, Figure 4.

The tubular member 10 and rod 12 may be formed of brass, copper or other suitable metal. Member 10 is freely slidable on the rod and to effect sliding movement of said member, for gripping a fish hook or the like, a flange or beaded portion 18 is provided on the rear of said member. The operator grasps the rod 12 by means of handle 14 and by applying his thumb to the flange 18 it is possible for the operator to effect longitudinal movement of tubular member 10. Only one hand is required for such manipulation and therefore the operator has his other hand free for holding the fish or other object in which the hook may be imbedded. Movement of member 10 on rod 12 is limited by the elongated slot 20 formed in the member and by pin 22 inserted in the rod.

For gripping the fish hook 23 or similar object the rod 12 is recessed or notched at 24 at the end opposite the handle 14. This notch coacts with the end 26 of the tubular member 10 to form the gripping means of the extractor. However, to facilitate the gripping action and to provide a probing point which facilitates the location of the fish hook when imbedded in a fish, the tubular member 10 is provided with lip 28 of arcuate shape. Said lip 28 extends forwardly of the end 26 and is located over the notch 24. The arcuate curvature of the same is in a direction outwardly with respect to the notch 24.

In operation of the extractor the forward projecting end of the rod 12 is associated with the curved extremity of the hook so that said rounded portion of the same becomes located in the notch 24. The insertion of the projecting end of the rod in the fish or the like is facilitated by pointing or rounding the forward end of the same as indicated by numeral 30. After the hook has been located in notch 24 the operator imparts forward movement to the tubular member 10 so that the hook is gripped by said members and thus positively held by the operator. By a few simple manipulations imparted to the fish hook by the extractor it is relatively easy to disengage the hook from the fish and remove the same. The hook is positively held by the extractor and control over the same is maintained throughout the operation.

The lip 28 formed on the forward end of tubular member 10 has a special formation which helps in locating the hook or similar object in the notch 24. Reference is made to the arcuate edges 32 of said lip 28. It will be observed that initial clamping of the fish hook takes place against the sloping edges 32 of the lip 28 and the bottom of the notch 24. When additional forward movement is applied to the tubular member the hook is firmly clamped between the notch 24 and the forward edge 26 of said tubular member. During this clamping action the hook is wedged down into the notch 24 by the sloping edges 32. For this purpose it is of course necessary that the lip 28 have location over the notch 24 and accordingly these parts coact in a special manner in locating and positioning the fish hook or similar article and then in gripping and clamping the same.

The invention is not to be limited to or by details of construction of the particular embodiment thereof illustrated by the drawings as various other forms of the device will of course be apparent to those skilled in the art without departing from the spirit of the invention or the scope of the claims.

What is claimed is:

1. In a fish hook extractor, the combination of a rod and a tubular member having telescoping relation therewith and being longitudinally movable on the rod, said rod having a handle fixed to one end and having a notch formed in its opposite end, means limiting the extent of movement of the tubular member and positioning the tubular member on the rod between said handle and the notch, and an arcuate lip portion integral with and extending from the end of the tubular member adjacent the notch, said lip portion flaring outwardly from the notch and having coaction therewith for gripping and clamping an object located in said notch, said gripping being effected by relative movement of the rod and tubular member.

2. In a fish hook extractor, the combination of a rod and a tubular member having telescoping relation therewith and being longitudinally movable on the rod, said rod having a handle fixed to one end and having a notch formed in its opposite end, said tubular member at the end adjacent the handle having a part formed thereon for facilitating movement of the tubular member on the rod, means limiting the extent of said movement and which positions the tubular member between the handle and the notch, and an arcuate lip portion extending forwardly of the tubular member at the end adjacent the notch, said lip portion being located substantially over the notch and being curved in an outward direction therefrom to provide outwardly curved side edges, said curved side edges coacting with the notch for gripping and clamping a member located in the notch.

ANTON ANDERSON.

REFERENCES CITED

The following references are of record in the file of this patent:

UNITED STATES PATENTS

| Number | Name | Date |
| --- | --- | --- |
| 1,539,221 | Tennant | May 26, 1925 |
| 1,592,836 | Moench | July 20, 1926 |
| 1,803,560 | Rodin | May 5, 1931 |
| 2,054,236 | Behr | Sept. 15, 1936 |
| 2,289,810 | Tallmadge | July 14, 1942 |

FOREIGN PATENTS

| Number | Country | Date |
| --- | --- | --- |
| 235,367 | Great Britain | June 18, 1925 |